US007386562B2

(12) United States Patent
Long

(10) Patent No.: US 7,386,562 B2
(45) Date of Patent: Jun. 10, 2008

(54) GENERIC PRODUCT FINDER SYSTEM AND METHOD

(75) Inventor: Thomas Edwin Long, Wake Forest, NC (US)

(73) Assignee: ABB Technology AG, Zurich (CH)

( * ) Notice: Subject to any disclaimer, the term of this patent is extended or adjusted under 35 U.S.C. 154(b) by 428 days.

(21) Appl. No.: 10/721,141

(22) Filed: Nov. 25, 2003

(65) Prior Publication Data

US 2005/0114310 A1 May 26, 2005

(51) Int. Cl.
*G06F 7/00* (2006.01)

(52) U.S. Cl. ...................... 707/102; 707/4; 707/103 R; 717/118

(58) Field of Classification Search .................... 707/3, 707/4, 10, 100, 102, 5, 103 R, 103 X, 103 Y, 707/103 Z, 2, 205; 715/513; 717/114, 116, 717/118, 120, 166
See application file for complete search history.

(56) References Cited

U.S. PATENT DOCUMENTS

| | | | | |
|---|---|---|---|---|
| 5,918,214 | A | 6/1999 | Perkowski | |
| 6,169,992 | B1 * | 1/2001 | Beall et al. | 707/103 R |
| 6,212,528 | B1 * | 4/2001 | Brophy et al. | 707/103 R |
| 6,829,606 | B2 * | 12/2004 | Ripley | 707/5 |
| 6,832,238 | B1 * | 12/2004 | Sharma et al. | 709/201 |
| 6,839,714 | B2 * | 1/2005 | Wheeler et al. | 707/102 |
| 6,877,111 | B2 * | 4/2005 | Sharma et al. | 714/13 |
| 6,912,569 | B1 * | 6/2005 | Sharma et al. | 709/223 |
| 6,922,695 | B2 * | 7/2005 | Skufca et al. | 707/10 |

(Continued)

FOREIGN PATENT DOCUMENTS

WO WO 01/27816 4/2001

OTHER PUBLICATIONS

Tu et al., Strategies for Integration of a Non-OO EIS and the J2EE Framework, Computer Software and Applications Conference, 2002. COMPSCI 2002, proceedings 26th Annual Conference, Aug. 26-29, 2002, pp. 246-251.*

(Continued)

*Primary Examiner*—Greta L Robinson
(74) *Attorney, Agent, or Firm*—Paul R. Katterle; Womble Carlyle Sandridge & Rice

(57) ABSTRACT

A generic product finder system that provides the capability of managing and performing searches on configurable products in a J2EE application. The generic product finder system includes a manager component for performing searches in response to a search query; a product component for persisting a plurality of product information and interacting with the manger component in conducting searches of the product information; a product metadata component that interacts with the manager component for defining a product; and a search configuration component that interacts with the manager component for constructing a set of search rules in a product search configuration. Internally, the product finder system represents products with a specification divided into parameters representing characteristics and optional attributes. This specification exists in a generic state by the use of Java objects. Multiple product specifications may co-exist and their information is persisted by the use of entity beans. The generic product also contains a session bean that acts as manager and single point-of-entry to the product information. Since the products are maintained in a generic form, search rules can be constructed and applied to the product set to perform complex queries.

8 Claims, 15 Drawing Sheets

U.S. PATENT DOCUMENTS

| | | | | |
|---|---|---|---|---|
| 2002/0004753 | A1 | 1/2002 | Perkowski | |
| 2002/0049607 | A1 | 4/2002 | Perkowski | |
| 2002/0073191 | A1 | 6/2002 | Perkowski | |
| 2002/0138481 | A1 | 9/2002 | Aggarwal et al. | |
| 2003/0018694 | A1 | 1/2003 | Chen et al. | |
| 2003/0050932 | A1 | 3/2003 | Pace et al. | |
| 2003/0074360 | A1* | 4/2003 | Chen et al. | 707/100 |
| 2003/0093717 | A1 | 5/2003 | Mason | |
| 2004/0015859 | A1* | 1/2004 | Potter et al. | 717/120 |
| 2005/0010578 | A1* | 1/2005 | Doshi | 707/100 |
| 2005/0262191 | A1* | 11/2005 | Mamou et al. | 709/203 |

OTHER PUBLICATIONS

Iyengar, S., A Universal Repository Architecture Using the OMG UML and MOF, Enterprise Distributed Object Computing, 1998., EDOC '98, Proceedings. Second International, Nov. 3-5, 1998, pp. 35-44.*

Michela Bertolotto et al., "iSmart<TM>+i-Spatial<TM> Information Server: Deploying Integrated Web-Based Spatial Applications Within an Oracle Database Environment", Proceedings of the SEcond International Conference On Web Information Systems Engineering, vol. 2, Dec. 3, 2001.

Dr. Jorg Friebe et al., "JDragon: Generating J2EE Applications Out Of Database Schemas and XMI Metadata", Proceedings Net. Objectdays 2003, Erfurt, Germany, Sep. 23, 2003.

* cited by examiner

```
<xsd:annotation>
      <xsd:documentation xml:lang="en">
 Product Specification Schema
</xsd:documentation>
  </xsd:annotation>
  <!-- All available product specifications -->
  <xsd:element name="specifications" type="SpecificationType"/>
  <xsd:complexType name="SpecificationType">
        <xsd:sequence>
              <xsd:element name="productSpecification" type="ProductSpecification"
maxOccurs="unbounded"/>
        </xsd:sequence>
  </xsd:complexType>
  <!-- Specific type of product -->
  <xsd:complexType name="ProductSpecification">
        <xsd:sequence>
              <!-- Characteristics are divided into parameters and accessories -->
              <!-- Parameters define more of the core characteristics of the product. -->
              <xsd:element name="parameters" type="ParameterType" minOccurs="0"/>
              <!-- Whereas accessories are more of add-on optional items -->
              <xsd:element name="accessories" type="AccessoryType" minOccurs="0"/>
        </xsd:sequence>
        <xsd:attribute name="name" type="non-empty-string" use="required"/>
        <xsd:attribute name="uniqueIdentifier" type="xsd:string" use="required"/>
  </xsd:complexType>
```

```
<xsd:complexType name="ParameterType">
     <xsd:sequence>
          <xsd:element name="parameter" maxOccurs="unbounded">
               <xsd:complexType>
                    <xsd:attribute name="name" type="non-empty-string" use="required"/>
                    <xsd:attribute name="description" type="non-empty-string" use="optional"/>
                    <xsd:attribute name="type" use="required">
                         <xsd:simpleType>
                              <xsd:restriction base="xsd:string">
                                   <xsd:enumeration value="java.lang.String"/>
                                   <xsd:enumeration value="java.lang.Double"/>
                                   <xsd:enumeration value="java.lang.Boolean"/>
                              </xsd:restriction>
                         </xsd:simpleType>
                    </xsd:attribute>
                    <xsd:attribute name="indexedField" use="optional">
                         <xsd:simpleType>
                              <xsd:restriction base="xsd:string">
                                   <xsd:enumeration value="true"/>
     </xsd:restriction>
                         </xsd:simpleType>
                    </xsd:attribute>
                    <xsd:attribute name="grooming" use="optional">
                         <xsd:simpleType>
                              <xsd:restriction base="xsd:string">
                                   <xsd:enumeration value="translate"/>
                                   <xsd:enumeration value="numericFormat"/>
                                   <xsd:enumeration value="trimLeadingZeros"/>
                                   <xsd:enumeration value="removeMultipleValues"/>
                              </xsd:restriction>
                         </xsd:simpleType>
```

```
                </xsd:attribute>
                <xsd:attribute name="emptyValueEqualsNull" use="required">
                      <xsd:simpleType>
                            <xsd:restriction base="xsd:string">
                                  <xsd:enumeration value="true"/>
                                  <xsd:enumeration value="false"/>
                            </xsd:restriction>
                      </xsd:simpleType>
                </xsd:attribute>
          </xsd:complexType>
      </xsd:element>
   </xsd:sequence>
</xsd:complexType>
<xsd:simpleType name="non-empty-string">
   <xsd:restriction base="xsd:string">
      <xsd:minLength value="1"/>
   </xsd:restriction>
</xsd:simpleType>
<xsd:complexType name="AccessoryType">
   <xsd:sequence>
      <xsd:element name="accessory" maxOccurs="unbounded">
         <xsd:complexType>
            <xsd:attribute name="name" type="non-empty-string" use="required"/>
            <xsd:attribute name="description" type="non-empty-string" use="optional"/>
            <xsd:attribute name="type" use="required">
               <xsd:simpleType>
                  <xsd:restriction base="xsd:string">
                     <xsd:enumeration value="java.lang.String"/>
                     <xsd:enumeration value="java.lang.Double"/>
                     <xsd:enumeration value="java.lang.Boolean"/>
                  </xsd:restriction>
               </xsd:simpleType>
```

```
                        </xsd:attribute>
                        <xsd:attribute name="grooming" use="optional">
                              <xsd:simpleType>
                                    <xsd:restriction base="xsd:string">
                                          <xsd:enumeration value="translate"/>
                                          <xsd:enumeration value="numericFormat"/>
                                          <xsd:enumeration value="trimLeadingZeros"/>
                                          <xsd:enumeration value="removeMultipleValues"/>
                                    </xsd:restriction>
                              </xsd:simpleType>
                        </xsd:attribute>
                        <xsd:attribute name="emptyValueEqualsNull" use="required">
                              <xsd:simpleType>
                                    <xsd:restriction base="xsd:string">
                                          <xsd:enumeration value="true"/>
                                          <xsd:enumeration value="false"/>
                                    </xsd:restriction>
                              </xsd:simpleType>
                        </xsd:attribute>
                  </xsd:complexType>
            </xsd:element>
      </xsd:sequence>
   </xsd:complexType>
</xsd:schema>
```

```
300     <xsd:annotation>
              <xsd:documentation xml:lang="en">
        Product Search Configuration Schema
           </xsd:documentation>
        </xsd:annotation>
302     <!-- There may be many search configurations, one for each type of product.
             They can be dynamically configured as needed. -->
        <xsd:element name="searchConfigurations" type="SearchConfigurationType"/>
        <xsd:complexType name="SearchConfigurationType">
              <xsd:sequence>
                    <xsd:element name="productSearchConfiguration" type="ProductSearchConfigurationType"
maxOccurs="unbounded"/>
              </xsd:sequence>
        </xsd:complexType>
        <!-- Search configuration for a specific type of product -->
        <xsd:complexType name="ProductSearchConfigurationType">
              <xsd:sequence>
                    <!-- Product Characteristics listed here are required to match, regardless of how "close"
a match is requested -->
304                 <xsd:element name="requiredToMatch" type="RequiredToMatchType" minOccurs="0"
maxOccurs="1"/>
                    <!-- Default Values to use in search for a characteristic that has no value -->
                    <xsd:element name="defaultValues" type="SearchGroupingType" minOccurs="0" maxOccurs="1"/>
                    <!-- Transformation of data to "normalize" values -->
                    <xsd:element name="transformations" type="SearchGroupingType" minOccurs="0"
maxOccurs="1"/>
                    <!-- Identifies the type of comparison to use on each characteristic -->
                    <xsd:element name="comparisons" type="SearchGroupingType" minOccurs="1" maxOccurs="1"/>
                    <!-- Assigns a weight to each characteristic.  This is used in determining how well a
"close" match fits. -->
                    <xsd:element name="weighting" type="SearchGroupingType" minOccurs="1" maxOccurs="1"/>
              </xsd:sequence>
              <xsd:attribute name="name" type="non-empty-string" use="required"/>
              <xsd:attribute name="percentageOfSuppliedCharacteristicsToMatch" type="percentage"
use="required"/>
```

FIG. 3A

304
```
</xsd:complexType>
<xsd:complexType name="RequiredToMatchType">
      <xsd:sequence>
            <xsd:element name="parameters" type="RequiredParameterType" minOccurs="0" maxOccurs="1"/>
            <xsd:element name="accessories" type="RequiredAccessoryType" minOccurs="0" maxOccurs="1"/>
      </xsd:sequence>
</xsd:complexType>
```
306
```
<xsd:complexType name="SearchGroupingType">
      <xsd:sequence>
            <xsd:element name="parameters" type="SearchParameterType" minOccurs="0" maxOccurs="1"/>
            <xsd:element name="accessories" type="SearchAccessoryType" minOccurs="0" maxOccurs="1"/>
      </xsd:sequence>
      <xsd:attribute name="defaultValue" type="non-empty-string"/>
</xsd:complexType>
```
308
```
<xsd:complexType name="SearchParameterType">
      <xsd:sequence>
            <xsd:element name="parameter" minOccurs="0" maxOccurs="unbounded">
                  <xsd:complexType>
                        <xsd:attribute name="name" type="non-empty-string" use="required"/>
                        <xsd:attribute name="value" type="non-empty-string" use="required"/>
                  </xsd:complexType>
            </xsd:element>
      </xsd:sequence>
      <xsd:attribute name="defaultValue" type="non-empty-string"/>
</xsd:complexType>
```
310
```
<xsd:complexType name="SearchAccessoryType">
      <xsd:sequence>
            <xsd:element name="accessory" minOccurs="0" maxOccurs="unbounded">
                  <xsd:complexType>
                        <xsd:attribute name="name" type="non-empty-string" use="required"/>
                        <xsd:attribute name="value" type="non-empty-string" use="required"/>
                  </xsd:complexType>
```

FIG. 3B

```
310 {               </xsd:element>
                </xsd:sequence>
                <xsd:attribute name="defaultValue" type="non-empty-string"/>
            </xsd:complexType>
            <xsd:complexType name="RequiredParameterType">
312 {           <xsd:sequence>
                    <xsd:element name="parameter" minOccurs="1" maxOccurs="unbounded">
                        <xsd:complexType>
                            <xsd:attribute name="name" type="non-empty-string" use="required"/>
                        </xsd:complexType>
                    </xsd:element>
                </xsd:sequence>
314 {       </xsd:complexType>
            <xsd:complexType name="RequiredAccessoryType">
                <xsd:sequence>
                    <xsd:element name="accessory" minOccurs="1" maxOccurs="unbounded">
                        <xsd:complexType>
                            <xsd:attribute name="name" type="non-empty-string" use="required"/>
                        </xsd:complexType>
                    </xsd:element>
                </xsd:sequence>
            </xsd:complexType>
            <xsd:simpleType name="non-empty-string">
                <xsd:restriction base="xsd:string">
                    <xsd:minLength value="1"/>
                </xsd:restriction>
            </xsd:simpleType>
            <xsd:simpleType name="percentage">
                <xsd:restriction base="xsd:nonNegativeInteger">
                    <xsd:minInclusive value="0"/>
                    <xsd:maxInclusive value="100"/>
                </xsd:restriction>
            </xsd:simpleType>
        </xsd:schema>
```

FIG. 3C

```xml
<specifications>
  <productSpecification name="E_Transformer" uniqueIdentifier="indexNumber">
    <parameters>
      <parameter name="indexNumber" type="java.lang.String" grooming="trimLeadingZeros" emptyValueEqualsNull="true" />
      <parameter name="type" type="java.lang.String" emptyValueEqualsNull="true" />
      <parameter name="designNumber" type="java.lang.String" emptyValueEqualsNull="true" />
      <parameter name="ratedPowerKVA" description="KVA Rating" type="java.lang.Double" indexedField="true" emptyValueEqualsNull="true" />
      <parameter name="ratedPowerLV1" type="java.lang.Double" emptyValueEqualsNull="true" />
      <parameter name="ratedPowerLV2" type="java.lang.Double" emptyValueEqualsNull="true" />
      <parameter name="primaryVoltageHv1" type="java.lang.Double" emptyValueEqualsNull="true" />
      <parameter name="primaryVoltageHv2" type="java.lang.Double" emptyValueEqualsNull="true" />
      <parameter name="secondaryVoltageLv1" type="java.lang.Double" emptyValueEqualsNull="true" />
      <parameter name="secondaryVoltageLv2" type="java.lang.Double" emptyValueEqualsNull="true" />
      <parameter name="tappingOnPrimary" type="java.lang.String" emptyValueEqualsNull="true" />
      <parameter name="connectionSymbol" type="java.lang.String" emptyValueEqualsNull="true" />
      <parameter name="impedanceVoltage" type="java.lang.Double" emptyValueEqualsNull="true" />
      <parameter name="typeOfCooling" type="java.lang.String" emptyValueEqualsNull="true" />
      <parameter name="noLoadLoss" type="java.lang.Double" emptyValueEqualsNull="true" />
      <parameter name="loadLoss" type="java.lang.Double" emptyValueEqualsNull="true" />
      <parameter name="maxAmbientTemp" type="java.lang.Double" emptyValueEqualsNull="true" />
      <parameter name="maxTempOfWindingsRise" type="java.lang.Double" emptyValueEqualsNull="true" />
      <parameter name="maxTempOfOilRise" type="java.lang.Double" emptyValueEqualsNull="true" />
      <parameter name="noiseLevel" type="java.lang.Double" emptyValueEqualsNull="true" />
      <parameter name="insulationLevelHv1" type="java.lang.String" emptyValueEqualsNull="true" />
      <parameter name="insulationLevelLv1" type="java.lang.String" emptyValueEqualsNull="true" />
      <parameter name="maxAltitude" type="java.lang.Double" emptyValueEqualsNull="true" />
      <parameter name="totalWeight" type="java.lang.Double" emptyValueEqualsNull="true" />
```

```
    <parameter name="preliminaryLength" type="java.lang.Double" emptyValueEqualsNull="true" />
    <parameter name="preliminaryWidth" type="java.lang.Double" emptyValueEqualsNull="true" />
    <parameter name="preliminaryHeight" type="java.lang.Double" emptyValueEqualsNull="true" />
    <parameter name="standard" type="java.lang.String" grooming="translate" emptyValueEqualsNull="true" />
    <parameter name="frequency" type="java.lang.Double" emptyValueEqualsNull="true" />
    <parameter name="noLoadLossTolerance" type="java.lang.Double" emptyValueEqualsNull="true" />
    <parameter name="loadLossTolerance" type="java.lang.Double" emptyValueEqualsNull="true" />
    <parameter name="totalLossesTolerance" type="java.lang.Double" emptyValueEqualsNull="true" />
    <parameter name="standardAccordingToCustSpec" type="java.lang.String" emptyValueEqualsNull="true" />
    <parameter name="impedanceTolerance" type="java.lang.Double" emptyValueEqualsNull="true" />
    <parameter name="lvWindingMaterial" type="java.lang.String" emptyValueEqualsNull="true" />
    <parameter name="hvWindingMaterial" type="java.lang.String" emptyValueEqualsNull="true" />
    <parameter name="noiseType" type="java.lang.String" emptyValueEqualsNull="true" />
    <parameter name="loadLoss_2" type="java.lang.Double" emptyValueEqualsNull="true" />
    <parameter name="primaryVoltageHv3" type="java.lang.Double" emptyValueEqualsNull="true" />
    <parameter name="tappingOnPrimaryHv2" type="java.lang.String" emptyValueEqualsNull="true" />
    <parameter name="tappingOnPrimaryHv3" type="java.lang.String" emptyValueEqualsNull="true" />
    <parameter name="costToManufacture" type="java.lang.Double" emptyValueEqualsNull="true" />
    <parameter name="productDescription" type="java.lang.String" emptyValueEqualsNull="true" />
  </parameters>
- <accessories>
```

420

```
    <accessory name="conservator" type="java.lang.String" emptyValueEqualsNull="true" />
    <accessory name="buchholzRelay" type="java.lang.String" emptyValueEqualsNull="true" />
    <accessory name="silicagelBreather" type="java.lang.String" emptyValueEqualsNull="true" />
    <accessory name="doubleContactThermometer" type="java.lang.String" emptyValueEqualsNull="true" />
    <accessory name="safetyValve" type="java.lang.String" emptyValueEqualsNull="true" />
```

```
        <accessory name="magneticOilLevelIndicator" type="java.lang.String" emptyValueEqualsNull="true" />
        <accessory name="oilLevelIndicator" type="java.lang.String" emptyValueEqualsNull="true" />
        <accessory name="hvAirInsulatedCableBox" type="java.lang.String" emptyValueEqualsNull="true" />
        <accessory name="lvAirInsulatedCableBox" type="java.lang.String" emptyValueEqualsNull="true" />
        <accessory name="hvBushing" type="java.lang.String" emptyValueEqualsNull="true" />
        <accessory name="lv1Bushing" type="java.lang.String" emptyValueEqualsNull="true" />
        <accessory name="lv2Bushing" type="java.lang.String" emptyValueEqualsNull="true" />
        <accessory name="paintingSpecification" type="java.lang.String" emptyValueEqualsNull="true" />
        <accessory name="terminalBox" type="java.lang.String" emptyValueEqualsNull="true" />
        <accessory name="oilType" type="java.lang.String" emptyValueEqualsNull="true" />
        <accessory name="electrostaticScreen" type="java.lang.String" emptyValueEqualsNull="true" />
        <accessory name="protectionDevice" type="java.lang.String" emptyValueEqualsNull="true" />
        <accessory name="windingTempIndicator" type="java.lang.String" emptyValueEqualsNull="true" />
        <accessory name="overpressureSwitch" type="java.lang.String" emptyValueEqualsNull="true" />
        <accessory name="finishPaintColor" type="java.lang.String" emptyValueEqualsNull="true" />
      </accessories>
    </productSpecification>
  </specifications>
```

FIG. 4C

```
300  - <searchConfigurations>
       - <productSearchConfiguration name="E_Transformer" percentageOfSuppliedCharacteristicsToMatch="100">
         - <requiredToMatch>
502        - <parameters>
               <parameter name="ratedPowerKVA" />
             </parameters>
           </requiredToMatch>
         - <defaultValues>
           - <parameters>
               <parameter name="noLoadLossTolerance" value="15" />
504            <parameter name="loadLossTolerance" value="15" />
               <parameter name="totalLossesTolerance" value="10" />
               <parameter name="standard" value="IECOIL" />
             </parameters>
           </defaultValues>
         - <transformations>
           - <parameters>
               <parameter name="tappingOnPrimary" value="CompressSpaces" />
506            <parameter name="tappingOnPrimaryHv2" value="CompressSpaces" />
               <parameter name="tappingOnPrimaryHv3" value="CompressSpaces" />
             </parameters>
           </transformations>
         - <comparisons defaultValue="ExactMatch">
           - <parameters>
               <parameter name="lvWindingMaterial" value="IgnoreCase" />
               <parameter name="hvWindingMaterial" value="IgnoreCase" />
508            <parameter name="totalWeight" value="DoNotExceed" />
               <parameter name="preliminaryLength" value="DoNotExceed" />
               <parameter name="preliminaryWidth" value="DoNotExceed" />
               <parameter name="preliminaryHeight" value="DoNotExceed" />
             </parameters>
```

```
  </comparisons>
- <weighting defaultValue="1">
  - <parameters defaultValue="2">
      <parameter name="ratedPowerKVA" value="3" />
      <parameter name="ratedPowerLV1" value="3" />
      <parameter name="ratedPowerLV2" value="3" />
      <parameter name="primaryVoltageHv1" value="3" />
      <parameter name="primaryVoltageHv2" value="3" />
      <parameter name="secondaryVoltageLv1" value="3" />
      <parameter name="secondaryVoltageLv2" value="3" />
      <parameter name="connectionSymbol" value="3" />
      <parameter name="impedanceVoltage" value="3" />
      <parameter name="typeOfCooling" value="3" />
      <parameter name="noLoadLoss" value="3" />
      <parameter name="loadLoss" value="3" />
      <parameter name="frequency" value="3" />
      <parameter name="noLoadLossTolerance" value="3" />
      <parameter name="loadLossTolerance" value="3" />
      <parameter name="totalLossesTolerance" value="3" />
      <parameter name="loadLoss_2" value="3" />
      <parameter name="primaryVoltageHv3" value="3" />
    </parameters>
  </weighting>
 </productSearchConfiguration>
</searchConfigurations>
```

```
- <parameters>
<ratedPowerKva value="800" />
<ratedPowerLv1 value="800" />
<ratedPowerLv2 value="" />
<primaryVoltageHv1 value="11500" />
<primaryVoltageHv2 value="" />
<secondaryVoltageLv1 value="420" />
<secondaryVoltageLv2 value="" />
<tappingOnPrimary value="+2 -2 2.5%" />
<connectionSymbol value="Dyn11" />
<impedanceVoltage value="6" />
<typeOfCooling value="ONAN" />
<noLoadLoss value="1300" />
<loadLoss value="10000" />
<maxAmbientTemp value="40" />
<maxTempOfWindingsRise value="65" />
<maxTempOfOilRise value="60" />
<noiseLevel value="71" />
<insulationLevelHv1_AC value="28" />
<insulationLevelHv1_BIL value="75" />
<insulationLevelLv1_AC value="3" />
<insulationLevelLv1_BIL value="0" />
<maxAltitude value="1000" />
<totalWeight value="2210" />
<weightOfOil value="498" />
<preliminaryLength value="1680" />
<preliminaryWidth value="1030" />
<preliminaryHeight value="1530" />
```

```
  <standard value="IECOIL" />
  <numberOfPhases value="3" />
  <frequency value="50" />
  <noLoadCurrent value="1" />
  <noLoadLossTolerance value="15" />
  <loadLossTolerance value="15" />
  <totalLossesTolerance value="10" />
  <standardAccordingToCustSpec value="" />
  <impedanceTolerance value="10" />
  <lvWindingMaterial value="AL" />
  <hvWindingMaterial value="CU" />
  <noiseType value="LPA" />
  <loadLoss_2 value="" />
  <primaryVoltageHv3 value="" />
- <accessories>
    <accessorie description="Hermetically sealed tank" type="TANK.TANK.HERM" />
    <accessorie description="Porcelain bushings" quantity="4" type="BUSH.BPOR.B001" section="LV1" />
    <accessorie description="Porcelain bushings" quantity="3" type="BUSH.BPOR.B001" section="HV1" />
    <accessorie description="Earthing terminals" quantity="2" type="EART.TERM.A001" />
    <accessorie description="Standard Drain Valve" type="VALV.VLVD.A001" />
    <accessorie description="Adhesive Rating Label" type="TAGS.RATI.STDR" />
    <accessorie description="Rating Plate/Label Fixed" type="TAGS.MNTY.FIXD" />
    <accessorie description="Bi-directional rollers" type="TANK.BASE.ROLL" />
    <accessorie description="5-step off-circuit changer (NLTC)" type="TAPCNG.VCNG.NL5" section="HV1"
      />
    <accessorie description="05.0051W Std water-based 120-200um" type="SURF.PNTS.PNS1" />
    <accessorie description="Test for alternate accessorie fields" type="LIQI.LLEV.CINC" />
    <accessorie description="Nynas Nytro 10GBN" type="OIL.OTPU.NYNU" />
  </accessories>
</parameters>
```

GENERIC PRODUCT FINDER SYSTEM AND METHOD

BACKGROUND OF THE INVENTION

The field the of the invention relates generally to data processing, and more specifically to methods and systems for managing and performing searches on configurable products.

Java 2 Platform, Enterprise Edition (J2EE) is a set of technologies and specifications developed by Sun Microsystems and supported by many computer and software vendors. J2EE is an environment for developing and deploying enterprise applications. The J2EE platform includes a set of services, application programming interfaces and protocols that provide the functionality for developing multi-tiered, web-based applications.

J2EE applications are made up of components. A J2EE component is a self-contained, functional software unit that is assembled into a J2EE application with its related classes and files and that communicates with other components. The J2EE specification defines the following J2EE components: (1) application clients and applets that run on the client; (2) Java Servlet and JavaServer Pages (JSP) technology components that run on the server; and (3) Enterprise JavaBeans (EJB) components that run on the server.

J2EE components are assembled into a J2EE application verified to be well-formed (i.e., syntactically correct) and in compliance with the J2EE specification, and deployed to production, where they are run and managed by the J2EE server. Deployment is the process whereby software is installed into an operational environment. Deployment descriptors (DDs) are XML files provided with each application that describes how the application should be deployed. DDs are used by the J2EE runtime execution environment to provide and enforce the quality of service attributes described in the DD.

An enterprise bean is a component that implements a business task or business entity and resides in an EJB container, either as an entity bean, a session bean, or a message-driven bean. A container is a standardize runtime environment that provides specific component services. An entity bean represents persistent data maintained in a database. An entity bean can manage its own persistence or delegate this function to its container. An entity bean is identified by a primary key. A primary key in an EJB is the subset of its attributes that are guaranteed to be unique. Persistence mechanisms in EJB containers are closely tied to databases. Entity beans map cleanly to tables. Each column maps to an attribute and each row maps to an entity. If the container hosting the entity bean crashes, the entity bean, its primary key and any remote references survive the crash. A message-driven bean is an asynchronous message consumer. A message-driven bean has no state for a specific client, but its instance variables may contain state across the handling of client messages, including an open database connection and an object reference to a EJB object. A client accesses a message-driven bean by sending messages to the destination for which the bean is a message listener. A session bean is created by the client and usually exists only for the duration of a single client-server session. A session bean performs operations such as calculations or accessing a database for the client. Although a session bean may be transactional, it is not recoverable should a system crash occur. Session bean objects can be either stateless or can maintain conversational state across methods and transactions. If a session bean manages state, then the EJB container manages this state if the object must be removed from memory. However, the session bean object itself must manage its own persistent data.

Extensible Markup Language (XML) enables definition of the tags (markups) needed to identify the content, data, and text in XML documents. It differs from HTML, in that HTML has fixed tags that deal mainly with style or presentation. XML tags use angle brackets as delimiters and identify the data rather than specifying how to display it. The XML approach is to wrap each data item in start/end tags; i.e., <start tag name> data <end tag name>. XML documents are well-formed with every tag having an identical closing tag, and with all tags completely nested. Attributes are bundled in with the start tag and take the form attribute-name="attribute-value". XML documents undergo a transformation into a language with style tags under the control of a stylesheet before it can be presented by a browser or other presentation mechanism. Typically, XML is transformed into HTML for presentation. J2EE deployment descriptors are expressed in XML with schemas defining allowed elements.

XML Schema Definition (XSD) specifies a formal description for the elements in an XML document. An XML schema represents the interrelationship between the attributes and elements of an XML object. The XSD description can be used to verify that each item of content in a document adheres to the description of the element in which the content is to be placed. XSD is written in XML and therefore does not require intermediate processing by a parser. Elements are defined within a set of tags as in XML or HTML. XSD is also self-documenting. XML schema provide two basic kinds of datatypes: primitive and derived. A primitive datatype is not defined in terms of other types. Examples of primitive datatypes are string, Boolean, float, double, decimal, binary, ID, IDREF. A derived datatype is defined in terms of existing datatypes. Examples of derived datatypes built into the XML schema are language, integer, date, time.

An XML schema includes a preamble followed by declarations. The preamble is a group of at least three attributes within the <schema> element. The different possible attributes are name, ref, type, use, value, id and form. The declarations allow the description of datatypes, element types, element attributes and content models. XML schema provide two types of datatype definitions. Simple definitions are used to create derived datatypes; complex definitions are used to describe content models. A simple type definition is a set of constraints on the value space and lexical space of a datatype. A complex type definition is a set of attribute declarations and a content type that pertain to the attributes and children of the element that is being specified. An <attribute> declaration associates an attribute name with a specific simple datatype. An <element> declaration provides a description that can be used for validation, provides value constraints, establishes constraining relationships between related elements and attributes. An element may contain annotation elements, datatype declarations (simple of complex), and related child elements. An element has a number of different possible attributes including name, ref, type, minOccurs, maxOccurs, default, fixed and id. The attributes minOccurs and maxOccurs describe the cardinality of child elements. The attribute minOccurs represents the minimum number of occurrences allowed; maxOccurs represents the maximum number of occurrences allowed with the default value the same as the value of minOccurs if no value is specified.

SUMMARY OF THE INVENTION

The generic product finder system is a Java 2 Platform, Enterprise Edition (J2EE) component that provides the capability of managing and performing searches on configurable products. In the context of the present invention, configurable products includes any type of product that can be described in a specification and stored electronically in a computer database. Configurable products include any product that has been configured using the techniques described herein. Internally, the product finder represents products with a specification divided into parameters representing characteristics and optional attributes. This specification exists in a generic state by the use of Java objects.

In an exemplary embodiment, the generic product finder system for managing and performing searches on configurable products in a J2EE application includes a manager component for performing searches in response to a search query; a product component for persisting a plurality of product information and interacting with the manger component in conducting searches of the product information, a product metadata component tat interacts with the manager component for defining a product; and a search configuration component that interacts with the manager component for constructing a set of search rules in a product search configuration, wherein the set of search rules include weight values to apply to product information for ordering of partial matches in determining products to identify as a result of the search performed.

In an exemplary embodiment, a method for managing and performing searches on configurable products in a J2EE application includes: (1) creating a manager component that conducts searches in a response to a search query; (2) generating a product metadata component that interacts with the product manager component to define a generic product specification; (3) persisting a plurality of product information that interacts with the manager component in conducting searches of the product information; (4) generating a search configuration component that interacts with the manager component in conducting searches for product information that matches a criterion in the search query; constructing a set of search rules to use in searching the plurality of product information; and applying weight values to product information to order partial matches in determining products to identify as a result of the search performed.

A computer program product for managing and performing searches on configurable products, the computer program product comprising:

a recording medium;

program instructions recorded on the recording medium for conducting searches in response to a search query;

program instructions recorded on the recording medium for defining a product specification;

program instructions recorded on the recording medium for persisting a plurality of product information and interacting with the program instructions for conducting searches for use in conducting searches of the product information for matching products;

program instructions recorded on the recording medium for generating a search configuration and interactive with the program instructions for conducting searches for product information that match a criterion in the search query;

program instructions recorded on the recording medium for defining a search configuration for each type of product; and program instructions recorded on the recording medium for applying weight values to product information to order partial matches in determining products to identify as a result of the search performed.

DESCRIPTION OF DRAWINGS

The invention is better understood by reading the following detailed description of the invention in conjunction with the accompanying drawings, wherein:

FIGS. 2A-2D illustrate the product schema definition for the generic product finder in accordance with an exemplary embodiment of the present invention.

FIGS. 3A-3C illustrate the product search configuration XML schema definition in accordance with an exemplary embodiment of the present invention.

FIGS. 4A-4C illustrate a sample product specification configuration in accordance with an exemplary embodiment of the present invention.

FIGS. 5A-5B illustrate a default search configuration in accordance with an exemplary embodiment of the present invention.

FIGS. 6A-6B illustrate a sample product search query in accordance with an exemplary embodiment of the present invention.

DETAILED DESCRIPTION OF THE INVENTION

Figure 1:
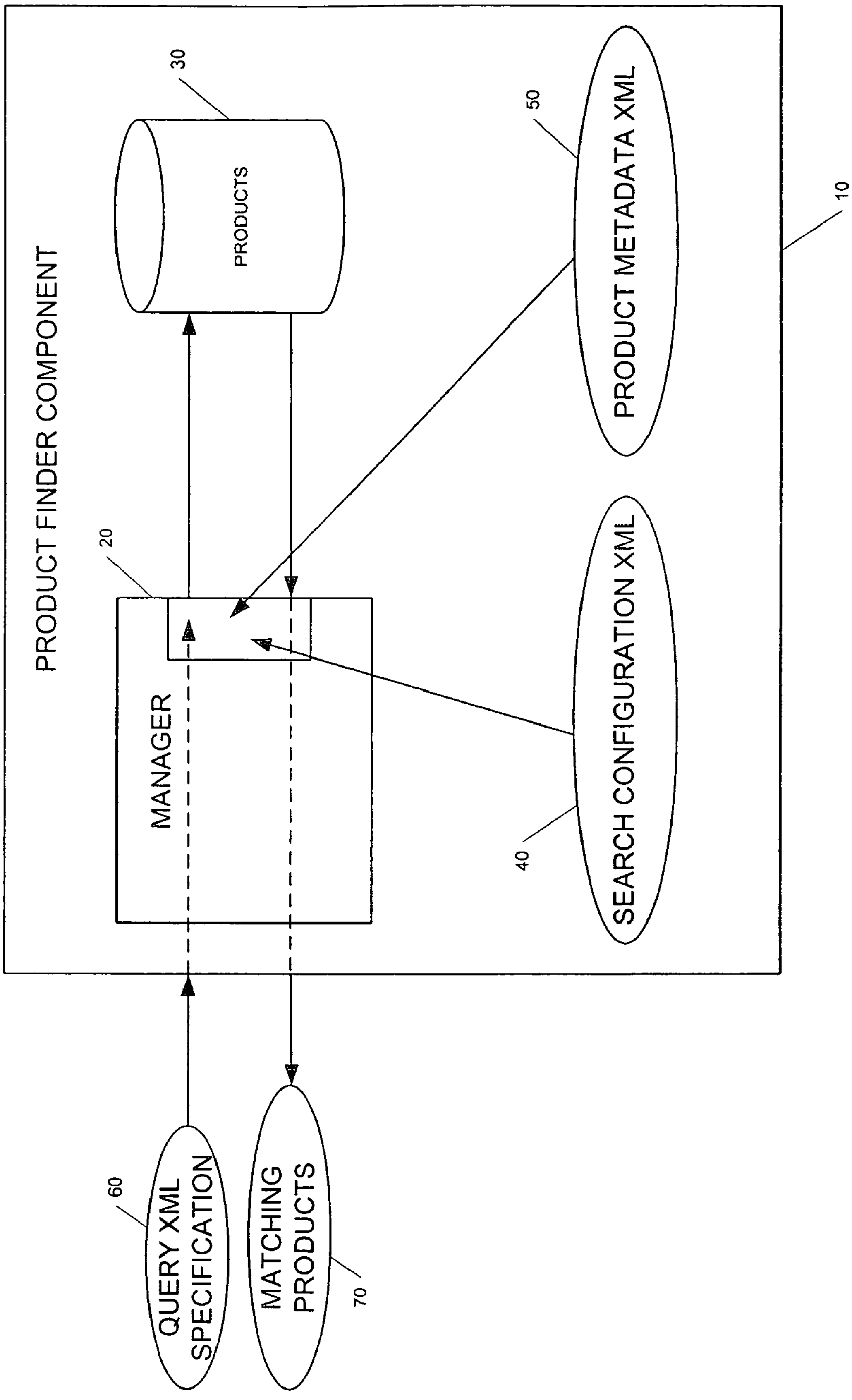
FIG. 1 illustrates a system component diagram of the generic product finder system in accordance with an exemplary embodiment of the present invention.

The following description of the present invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without using other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

FIG. 1 illustrates a system component diagram of the generic product finder system in accordance with an exemplary embodiment of the present invention. The generic product finder system 10 is a J2EE component that provides the capability for performing and managing searches (manager component 20) on configurable products that can be described via a software specification. The product's specification is in turn defined by XML metadata (product metadata XML 50) that is configured when the component is integrated with an application. Multiple product specifications may co-exist and their information is persisted (data storage 30) by the use of entity beans. This J2EE component also contains a session bean that acts as manager and single point-of-entry to the product information. Since the products are maintained in a generic form, search rules can be constructed (search configuration XML 40) and applied to the product set 30 (as a whole) to perform complex queries (query XML specification 60). An example of such a query would be to find the lowest cost-to-manufacture product, where the product matches 90% of the specification provided in the query. The output from the complex query is a list of matching products 70.

The product finder system 10 represents products by a set of parameters (also known as the "specification") that are divided into characteristics and optional attributes. Internally, hashmaps are used to store the specification for a product instance as Java objects (products 30). The product specification is a set of information whose type and semantics are unknown. A separate set of product metadata 50 is to be configured in XML. This XML metadata 50 is used by the product finder system 10 when inspecting the contents of a product instance (products 30). The XML metadata 50 allows for deciphering this generic information into something concrete to work with. Multiple types of products may be defined in the XML and can co-exist in the persisted data 30. In their natural state there is no distinction among persisted products 30.

Now that generic products 30 can be stored and maintained in the product manager 20, complex queries need to be constructed for retrieving products. By complex queries, it is meant that behavior other than a simple "is equal" on the entire product can be initiated. The complex queries are determined by search rules, which may include any of the following, alone or in combination:

(1) incomplete specifications;
(2) request for incomplete matches;
(3) ordering results based upon specific parameters;
(4) granularity of match behavior defined at parameter level (describe below);
(5) ability to provide tolerances for determining matches per parameter;
(6) matching parameters based upon strictly equal, within a supplied tolerance (for numeric parameters), below a defined threshold (for numeric parameters); or
(7) presence in a subset of equivalent objects.

In the above list of search rules, granularity of match behavior defined at a parameter level refers to the fact that the search rules can be configured on the smallest granularity of a parameter, as opposed to rough granularity on the entire search specification. For example, one search configuration may indicate that a specific parameter: (1) has irregular data normalized, (2) is required to be matched for inclusion in partial match search results, (3) is given a default value to match if a value is not specified in a search query, (4) is considered a match if the numeric value does not exceed a threshold, and/or (5) has a low impact weight for intelligent ordering of partial matches.

These complex search rules (search configuration 40) can be defined in XML, and multiple sets of search rules can be applied at different times. The search rules combine with the product metadata 50 to determine matches 70 between a query specification 60 (supplied by an external query to the product finder) and the set of persisted product information 30.

The characteristics that distinguish the generic product finder system 10 are:

(1) A fully self-contained J2EE component that can be dropped into an arbitrary J2EE application to provide concurrent multiple product searches and management capabilities.
(2) Development of a self-contained reusable-J2EE component that can manage and search on an arbitrary product. Such a component can be distributed and incorporated into any number of applications that need the capability to persist, retrieve, manipulate and/or search on a product regardless of the problem domain.

FIGS. 2A-2D illustrate the product schema definition for the generic product finder system in accordance with an exemplary embodiment of the present invention. This XML schema definition defines the rules to be followed when creating product metadata. In this specific example, the XML schema describes a transformer product that was configured in the generic product finder system. All product metadata (described in XML) in this exemplary embodiment must conform to this XML schema definition. The product manager component 20 controls access to, and manipulation of, the products 30. The product finder manager component 20 loads the product metadata XML 50 in order to recognize how to translate generically persisted products 30 into specific products that it has been configured to support. A default Simple Access Object Protocol (SOAP) interface is used to access the generic product finder system 10, but the interface can just as easily be integrated into a J2EE application through the product manager's remote interface. The Simple Object Access Protocol (SOAP) is a minimal set of conventions for invoking code using XML and Hypertext Transfer Protocol (HTTP).

The product schema definition in FIG. 2A includes an annotation element 200 that describes the schema (e.g., Product Specification Schema) and comments 204 (delimited by <! comment>) that indicate product characteristics are divided into parameters and accessories. Parameters are used to define core characteristics of the product. Accessories are used to define add-on optional items. Each attribute is defined by a series of three space-separated values. The first element in each line is the name of the attribute; the second element indicates the type of data; and the third element determines the attribute's default value, if any, and indicates whether or not the attribute is required. A "required" attribute value must be specified in the document; an "optional" value need not be specified; a "default" value is the value to use if a value is not specified in the document. The product specification schema for "parameter type" is indicated at 208 in FIG. 2B. It includes descriptions of attributes 210 for the "parameter" element with a list of enumeration values. Also provided in the schema for the "parameter" element are restricted attributes 212 with a list of enumeration values. The product specification schema for "accessory type" is indicated at 214 in FIG. 2C. It includes descriptions of attributes 216 for the "accessory" element with a list of enumeration values. Also provided in the schema for "accessory" element are restricted attributes 218 (FIG. 2D) with a list of enumeration values.

FIGS. 3A-3C illustrate the product search configuration XML schema definition in accordance with an exemplary embodiment of the present invention. This XSD file defines the rules that must be followed in defining a set of product search behavior. The product search schema definition in FIG. 3A includes an annotation element 300 that identifies the XML schema as "Product Search Configuration Schema". The comments 302 indicate that many search configurations are possible, with one configuration for each type of product. Furthermore, product search configurations can be generated dynamically. The search configuration schema includes a specification for "requiredToMatch" elements 304 (FIGS. 3A-3B). Comments in this section of the listing indicate that (1) product characteristics listed are required to be matched, no matter how close a match is requested; (2) default values are to be used in searching for a characteristic that has no defined value; (3) data is to be transformed to normalized values; (4) the type of comparison to use on each characteristic is identified ("SearchGroupingType"); and (5) the weighting to assign each chart eristic in determining how well a close match fits. The "SearchGroupingType" listing 306 (FIG. 3B) includes element declarations for parameters and accessories. The "SearchParameterType" 308 (FIG. 3B) and "SearchAccesoryType" 310 (FIGS. 3B-3C) listings specify the parameter and accessory element attributes, respectively. The "RequiredParameterType" 312 and "RequiredAccessoryType" 314 listings (FIG. 3C) specify the required parameter and required accessory element attributes, respectively.

FIGS. 4A-4C illustrate a sample product specification configuration for a transformer in accordance with an exemplary embodiment of the present invention. It identifies the product specification as "E_Transformer" 400. Parameter specifications are provided in section 410 of the listing (FIGS. 4A-4B). Accessory specifications are provided in section 420 of the listing (FIGS. 4B-4C). Defined parameters for the transformer include rated power, primary voltage, secondary voltage, impedance voltage, type of cooling, maximum ambient temperature, preliminary length, width and height dimensions, frequency, load loss tolerance, etc. Defined accessories for the transformer include conservator, Buchholz relay, silica gel breather, double contact thermometer, safety valve, electrostatic screen, protection device, overpressure switch, etc.

FIGS. 5A-5B illustrate a default search configuration in accordance with an exemplary embodiment of the present invention. Weight values are defined at the end of the file. This is used in the intelligent selection process for eliminating partial matches that are not appropriate in a particular context (i.e., if the match percentage is less than 100 for a particular search). The product search configuration in FIG. 5A identifies the search configuration for "E_Transformer" 500. The percentage of supplied characteristics to match has a default value of 100%. The required to match parameters are provided in section 502 of the search configuration. Rated power (KVA) is listed as a parameter to match in the product search. Default parameter values for the transformer are provided in section 504 of the listing. Transformations (i.e., data normalizations) are provided in section 506 of the listing. The types of comparison to use on different parameters are listed in section 508 of the listing. The weighting values for various transformer parameters are provided in section 510 of the listing as shown in FIG. 5B. For example, rated power (KVA) is given a weighting value of 3. The default weighting value for transformer parameters is 2.

FIGS. 6A-6B illustrate an exemplary product search query for transformers using the invention. Exemplary parameters and corresponding search values are indicated at 610 in FIGS. 6A-6B. The parameters include rated power, primary voltage, secondary voltage, type of cooling, insulation levels, preliminary dimensions, number of phases, frequency, load loss tolerance, etc. Accessory descriptions are indicated at 620 in FIG. 6B. The accessories include hermetically sealed tank, porcelain bushings, standard drain valve, adhesive rating label, etc.

It is important to note that although the present invention has been described in the context of a fully functioning data processing system, those skilled in the art will appreciate that the mechanisms of the invention are capable of being distributed in the form of computer program instructions in a variety of forms which when executed on the data processing system perform the methods described herein. The present invention applies regardless of the type of signal bearing medium used to carry out the distribution. Examples of signal bearing mediums include nonvolatile hard-coded mediums such as read-only memories, recordable type mediums such as floppy disks, hard disk drives and CD-ROMS, and transmission type mediums such as digital and analog communication links.

While the invention has been particularly shown and described with reference to a preferred embodiment thereof, it will be understood by those skilled in the art that various other changes in form and detail may be made without departing from the spirit and scope of the invention.

What is claimed:

1. A method of forming a searchable store of information about specific physical products, the method comprising:

(a.) providing data storage;

(b.) providing a computer program product comprising: computer-readable medium;

a reusable product finder software unit stored on the computer-readable medium, the product finder software unit comprising:

a plurality of product objects, each product object representing information for a generic product;

a product manager for performing searches;

a set of metadata rules; and a set of search rules;

(c.) combining the product finder software unit with other software to form a software application;

(d.) creating product specifications for the specific physical products using the metadata rules;

(e.) storing the product specifications in the data storage using the product objects; and (f.) creating a search configuration in accordance with the search rules; and wherein the product manager in the software application is operable to perform searches of the product specifications using the product objects, the searches being performed in accordance with the search configuration.

2. The method of claim 1, wherein the product objects comprise Java entity beans and the product manager comprises a Java session bean.

3. The method of claim 2, wherein the product objects represent information for a generic product by a set of parameters comprising characteristics and attributes.

4. The method of claim 3, wherein the parameters are stored using hashmaps.

5. The method of claim 1, wherein the specific physical products are transformers.

6. The method of claim 1, wherein the set of metadata rules is an XML schema.

7. The method of claim 1, wherein the set of search rules is an XML schema.

8. The method of claim 1, wherein the set of search rules include weight values to apply to product specifications for ordering of partial matches to identify specific physical products meeting the search configuration.

* * * * *